(12) United States Patent
Matsushita

(10) Patent No.: US 8,006,552 B2
(45) Date of Patent: Aug. 30, 2011

(54) WIND TURBINE GENERATOR SYSTEM AND METHOD THEREOF FOR JUDGING LIGHTNING ENERGY LEVEL

(75) Inventor: Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/444,645

(22) PCT Filed: Apr. 24, 2008

(86) PCT No.: PCT/JP2008/057906
§ 371 (c)(1),
(2), (4) Date: Apr. 7, 2009

(87) PCT Pub. No.: WO2008/139878
PCT Pub. Date: Nov. 20, 2008

(65) Prior Publication Data
US 2010/0077850 A1    Apr. 1, 2010

(30) Foreign Application Priority Data
May 11, 2007    (JP) .................................. 2007-126473

(51) Int. Cl.
*G01W 1/16*    (2006.01)
*F03D 1/06*    (2006.01)
(52) U.S. Cl. ..................................... 73/170.24; 416/230
(58) Field of Classification Search .......................... None
See application file for complete search history.

(56) References Cited

U.S. PATENT DOCUMENTS

| 7,040,864 | B2 | 5/2006 | Johansen et al. | |
|---|---|---|---|---|
| 2007/0012472 | A1 | 1/2007 | Goodson | |
| 2007/0253827 | A1* | 11/2007 | Dahl et al. | 416/230 |
| 2008/0150292 | A1* | 6/2008 | Fedor et al. | 290/55 |
| 2008/0232020 | A1* | 9/2008 | Dahl et al. | 361/117 |
| 2009/0266160 | A1* | 10/2009 | Jeffrey et al. | 73/455 |
| 2010/0011862 | A1* | 1/2010 | Kuhlmeier | 73/587 |

FOREIGN PATENT DOCUMENTS

| EP | 1011182 A1 * | 6/2000 |
|---|---|---|
| JP | 2005062080 A | 3/2005 |
| JP | 2006052719 A | 2/2006 |
| JP | 2006275845 A | 10/2006 |

OTHER PUBLICATIONS

ISR for PCT/JP2008/057906 mailed Jun. 17, 2008.
Chinese Office Action for Application No. 200880001033.0 mailed Sep. 2, 2010.
Korean Office Action for Application No. 2009-7009058, issued Jan. 26, 2011.

* cited by examiner

*Primary Examiner* — Andre J Allen
(74) *Attorney, Agent, or Firm* — Kanesaka Berner and Partners LLP

(57) ABSTRACT

A wind turbine generator system that can quantitatively determine the energy of a lightning strike on a wind turbine blade is provided. In the wind turbine generator system generating electricity by driving an electrical generation mechanism through rotation of a rotor head to which wind turbine blades are attached, an electrically conductive shield tape for judging the charge quantity (C) of a lightning strike is bonded to surfaces of the wind turbine blades.

10 Claims, 3 Drawing Sheets

CURRENT WAVEFORM
(SINE WAVE)

FIG. 3

| TEST NO. | ENERGY DENSITY (MJ/ohm) | CHARGE QUANTITY (C) | PEAK CURRENT (kA) | DURATION (ms) | NUMBER OF TESTS | DAMAGE LEVEL |
|---|---|---|---|---|---|---|
| 1 | 0.10 | 29.0 | 4.6 | 10 | 3 | TINY HOLE |
| 2 | 0.64 | 72.0 | 11.3 | 10 | 2 | DAMAGE OF SEVERAL CENTIMETERS |
| 3 | 2.52 | 143.0 | 22.5 | 10 | 1 | DAMAGE OF ABOUT 10cm WIDTH |
| 4 | 10.0 | 285.0 | 44.7 | 10 | 1 | DAMAGE OF ABOUT 20cm WIDTH |

# WIND TURBINE GENERATOR SYSTEM AND METHOD THEREOF FOR JUDGING LIGHTNING ENERGY LEVEL

RELATED APPLICATIONS

The present application is based on International Application Number PCT/JP2008/057906 filed Apr. 24, 2008, and claims priority from Japanese Application Number 2007-126473 filed May 11, 2007, the disclosures of which are hereby incorporated by reference herein in their entirety.

TECHNICAL FIELD

The present invention relates to a wind turbine generator system using a wind turbine that converts natural wind power to rotary power for generating electricity and to a method thereof for judging a lightning energy level.

BACKGROUND ART

Wind turbine generator systems generating electricity using wind power, which is natural energy, have been conventionally known. This type of wind turbine generator system includes a rotor head to which wind turbine blades are attached, a main shaft coupled to the rotor head so as to integrally rotate with the rotor head, a gear box coupled to the main shaft that rotates by means of wind power received by the wind turbine blades, and a generator driven by shaft output power from the gear box, which are provided in a nacelle mounted atop a tower. In the thus-configured wind turbine generator system, the rotation of the main shaft and the rotor head provided with the wind turbine blades that convert wind power to rotary power generates shaft output power. The output power of the shaft, whose rotational speed is stepped-up by the gear box coupled to the main shaft, is transmitted to the generator. Accordingly, the shaft output power obtained by converting wind power to rotary power works as the driving source of the generator, and thereby electricity can be generated using wind power as the motive energy of the generator.

The above-mentioned wind turbine generator system has a problem in that the wind turbine blades are struck by lightning at the ends, intermediate portions, and other portions. Accordingly, in conventional wind turbine blades, a lightning protection system is employed in which metal pieces (so-called receptors) for lightning conduction are attached to the wind turbine blades and the metal lightning-conducting portion receives lightning energy and discharges the energy to the earth.

In addition, there are also lightning protection systems in which electrically conductive metal sheets for lightning conduction are mounted on surfaces of wind turbine blades and the metal sheets for lightning conduction receive lightning energy and discharge the energy to the earth (for example, see Patent Document 1).
Patent Document 1: U.S. Pat. No. 7,040,864

DISCLOSURE OF INVENTION

In the above-described conventional lightning protection systems, the wind turbine blades can be protected by discharging the energy of a lightning strike to the earth. However, the degree (magnitude) of the energy of the lightning strike cannot be determined. Therefore, for example, regarding repair measures for a wind turbine blade struck by lightning and the defraying of expenses when damage occurs, either the user or an insurance company will generally pay the repair expenses or damage costs based on an insurance policy, but quantitative evaluation and determination are difficult.

That is, in spite of the great variety of lightning, from lightning having low energy and occurring at a high frequency to lightning occurring at a low frequency and having high energy, actually there is no means or method suitable for quantitatively evaluating and determining from the conditions of the lightning strike who is responsible for compensation for damage based on the insurance policy. Furthermore, there are apparatuses for determining the energy level by measuring the charge quantity of lightning, but it is necessary to attach this expensive apparatus to each wind turbine generator system. Therefore, enormous investment is necessary, particularly, in a wind farm where a large number of wind turbine generator systems stand together. Therefore, it is impractical.

With this background, when the wind turbine blade of a wind turbine generator system is struck by lightning, it is required to discharge the energy of the lightning strike to the earth for protecting the wind turbine blade and also to quantitatively determine the degree (magnitude) of the energy of the lightning strike for adequately carrying out measures such as repair.

The present invention has been accomplished in view of the above-mentioned circumstances, and it is an object thereof to provide a wind turbine generator system that can quantitatively determine the energy of a lightning strike and a method for judging the lightning energy level.

The present invention employs the following solutions for solving the above-mentioned problems.

The wind turbine generator system of the present invention is a wind turbine generator system generating electricity by driving an electrical generation mechanism through rotation of a rotor head to which a wind turbine blade is attached, and an electrically conductive shield tape for judging the charge quantity (C) of a lightning strike is bonded to surfaces of the wind turbine blade.

In such a wind turbine generator system, since the electrically conductive shield tape for judging charge quantity (C) of a lightning strike is bonded to the surfaces of the wind turbine blade, the charge quantity (C) of the lightning strike can be judged from the size of a damaged area in the electrically conductive shield tape due to the lighting strike. This judgment is based on the finding obtained from experiments and research by the present inventors: that is, it is based on the finding that the size of the damaged area formed in the electrically conductive shield tape by a lightning strike correlates with the charge quantity of the lightning strike.

The method for judging the energy level of a lightning strike in the wind turbine generator system of the present invention is a method of judging the energy level of a lightning strike in a wind turbine generator system generating electricity by driving an electrical generation mechanism through rotation of a rotor head to which a wind turbine blade is attached, and an electrically conductive shield tape is bonded to surfaces of the wind turbine blade to determine the charge quantity of a lightning strike from the size of a damaged area formed in the electrically conductive shield tape by the lightning strike.

In such a method of judging the energy level of a lightning strike on the wind turbine generator system, since an electrically conductive shield tape is bonded to surfaces of the wind turbine blade and the charging quantity of the lightning strike is judged from the size of the damaged area formed by the lightning strike on the electrically conductive shield tape, the degree (magnitude) of the energy of the lightning strike can be quantitatively determined. Furthermore, it is known that the lightning energy correlates with the charge quantity.

According to the present invention described above, the degree (magnitude) of the energy of a lightning strike is quantitatively determined easily using a simple and inexpensive configuration in which an electrically conductive shield tape for judging the charge quantity of a lightning strike is bonded to surfaces of the wind turbine blade. Accordingly, measures, such as repairs, required after a lightning strike can be adequately determined, and it becomes possible to definitely decide, for example, who is responsible for expenses necessary for repair of damaged portions or compensation for damage, based on the quantitative value of the lightning energy.

BRIEF DESCRIPTION OF DRAWINGS

FIG. 3 is a table showing the results obtained in the experiment of FIG. 2A.

EXPLANATION OF REFERENCE SIGNS

Figure 1:
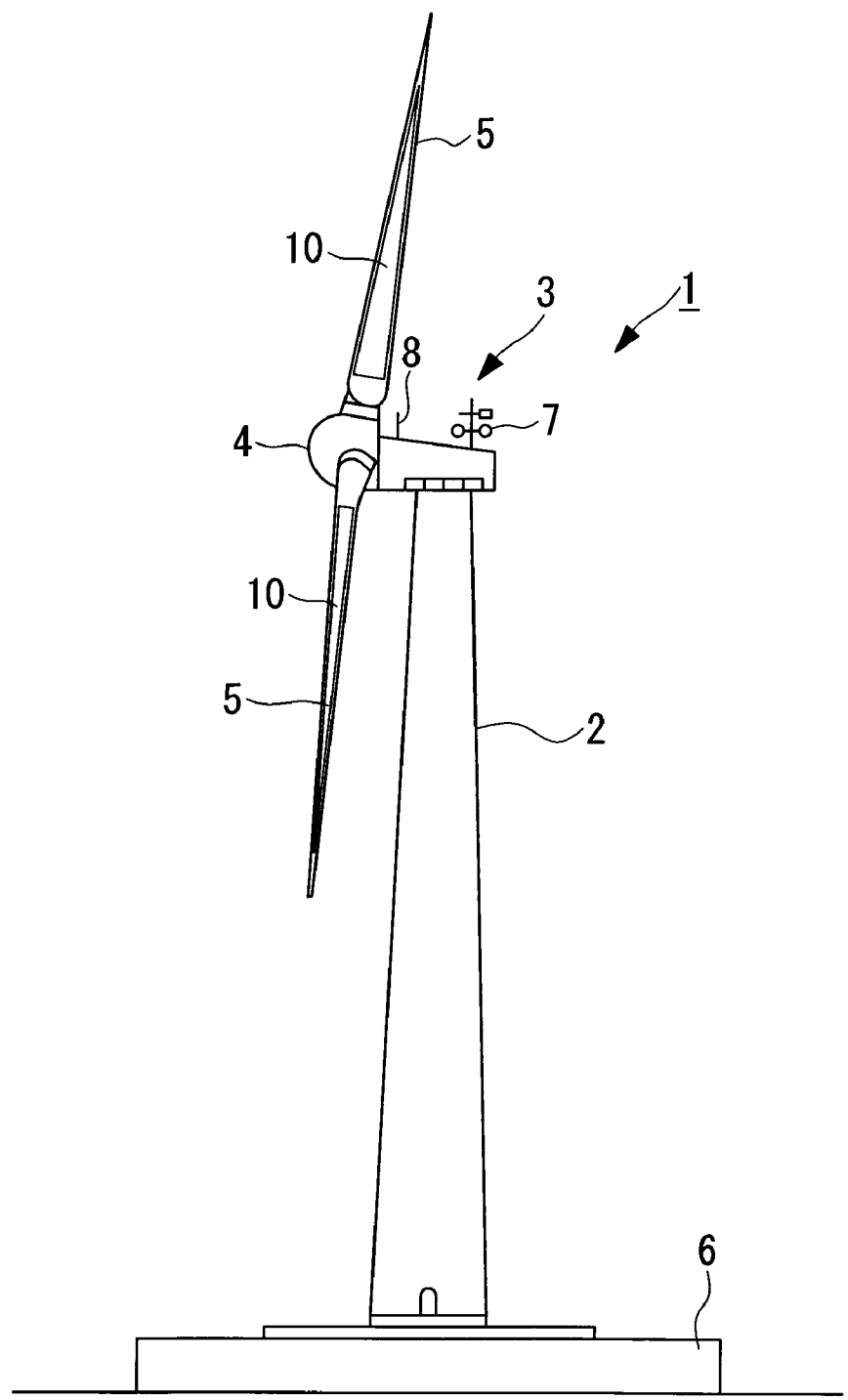
FIG. 1 is a diagram showing an example of the whole configuration of a wind turbine generator system, as an embodiment of the wind turbine generator system according to the present invention.

1: wind turbine generator system
2: tower
3: nacelle
4: rotor head
5: wind turbine blade
7: wind direction and speed meter
10: electrically conductive shield tape
20: charger
21: switch
22: electrical wire
23: electrode
24: electrical wire for electricity conduction

BEST MODE FOR CARRYING OUT THE INVENTION

An embodiment of the wind turbine generator system according to the present invention will now be described based on the drawings.

As shown in FIG. 1, the wind turbine generator system 1 includes a tower 2 vertically installed on a base 6, a nacelle 3 mounted atop the tower 2, and a rotor head 4 provided on the nacelle 3 so as to be rotatable around an approximately horizontal axis.

The rotor head 4 is fitted with a plurality of wind turbine blades 5 that are arranged radially around the rotation axis thereof. As a result, the force of wind blowing against the wind turbine blades 5 from the direction of the rotation axis of the rotor head 4 is converted into motive energy causing the rotor head 4 to rotate around the rotation axis.

A wind direction and speed meter 7 for measuring wind direction and wind speed at the circumference and a lightning rod (receptor) 8 are provided at appropriate portions (for example, the upper side) on the external face of the nacelle 3.

Surfaces of the wind turbine blades 5 are provided with electrically conductive shield tape 10. This electrically conductive shield tape 10 has a configuration in which, for example, an electrically conductive material containing a conductor, such as copper, aluminum, iron, or an alloy thereof, is covered with a sheet-like protective cover. The electrically conductive material of the electrically conductive shield tape 10 is in the form of a thin sheet or a thin-line mesh in order to minimize the increase in weight of the wind turbine blades 5. In addition, there is no need to apply the above-mentioned electrically conductive shield tape 10 to the whole surfaces of the wind turbine blades 5, and the application positions may be adequately selected according to various conditions such as the shape and size.

The above-mentioned electrically conductive shield tape 10 is attached and bonded to surfaces of the wind turbine blades 5. Therefore, the electrically conductive material and the protective cover, in particular, the protective cover covering the electrically conductive material, are made of materials having excellent light resistance, water resistance, and fire resistance so that they can sufficiently endure changes in natural phenomena such as wind, rain, snow, and temperature. Furthermore, an additive used here also sufficiently endures changes in natural phenomena, for example, it has satisfactory weather resistance, as in the electrically conductive shield tape 10.

Such electrically conductive shield tape 10 is formed to be as thin as possible as a whole in order not to affect the blade shape of the wind turbine blades 5. Furthermore, the electrically conductive shield tape 10 has flexibility so as to fit the curved faces of the blades and be attached thereto and can expand and contract according to vibration of the wind turbine blades 5.

For example, when the above-mentioned electrically conductive shield tape 10 attached to a surface of the wind turbine blade 5 is struck by lightning, the size of the damaged area changes depending on the charge quantity (C). This was newly found in the following experiment and research conducted by the present inventors.

Figure 2A:
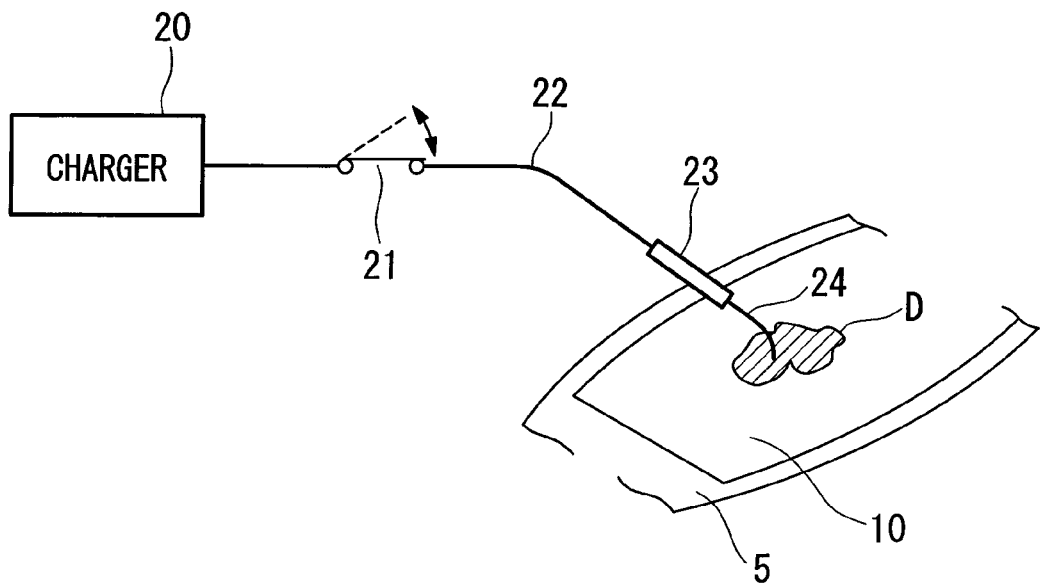
FIG. 2A is a configuration diagram showing an experimental overview of an experiment for measuring damage D caused by simulated lightning.

FIG. 2A is a configuration diagram showing an overview of the experiment. The above-mentioned electrically conductive shield tape 10 is attached to a surface of the wind turbine blade 5. The damage levels were confirmed and determined from the sizes of damage D caused in the electrically conductive shield tape 10 by sequentially subjecting the electrically conductive shield tape 10 to simulated lightning generated at different levels.

The simulated lightning is generated by discharging electricity from an electrode 23 that is attached to the end of an electrical wire 22 connected to a charger 20 via a switch 21. One end of the electrode 23 is provided with a fine electrical wire for electricity conduction 24, and the other end of the electrical wire for electricity conduction 24 is in contact with the electrically conductive shield tape 10.

Figure 2B:
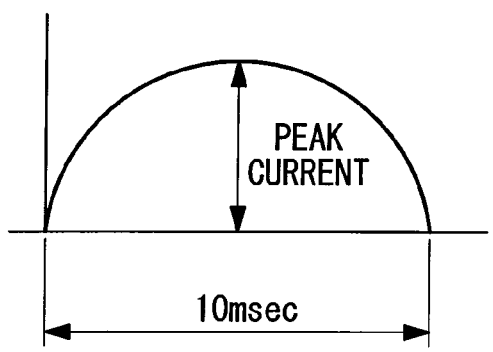
FIG. 2B is a diagram showing a current waveform of simulated lightning in the experiment for measuring damage D caused by simulated lightning.

The simulated lightning is generated at the end of the electrode 23 by switching the switch 21 to the ON state when there is a sufficient amount of charge in the charger 20. This simulated lightning is a current having a current waveform (sine wave) as shown in FIG. 2B and is discharged from the electrode 23 and conducted to the surface of the electrically conductive shield tape 10 by the electrical wire for electricity conduction 24. As a result, a phenomenon similar to a lightning strike is generated on the surface of the electrically conductive shield tape 10 to cause damage D.

Simulated lightning was generated in the experiment of test numbers 1 to 4 by varying the energy density, charge quantity, and peak current conditions, as shown in FIG. 3, using the above-mentioned device for generating simulated lightning, and levels of damage caused in the electrically conductive shield tape 10 were inspected. The duration of the sine wave shown in FIG. 2B was controlled to 10 msec in all tests.

According to these test results, as shown in FIG. 3, it was confirmed that when the energy density, charge quantity, and peak current are smaller, the damage level is lower. That is, when the charge quantity is 29.0 (C), the damage level is of a degree forming tiny holes, and the damage level is increased with an increase in charge quantity. When the charge quantity is 285.0 (C), the width of damage D is extended to about 20 cm. In addition, the region where the damage is caused by the lightning strike is limited to the area where the electrically conductive shield tape 10 is attached and is not extended to other regions of the wind turbine blade 5.

From these test results, it was confirmed that damage D of the electrically conductive shield tape 10 is increased with an increase in the charge quantity of the lightning strike.

Therefore, from the above-mentioned test results, it can be judged that, when the width of the damage level caused in the electrically conductive shield tape 10 by the lightning strike is larger than a predetermined value, specifically, in the above experiment, when the level of damage D caused by simulated lightning with a charge quantity of 285.0 (C) is larger than 20 cm, it corresponds to a lightning strike having a large energy of at least 300 (C), even in view of some slight range of error.

As a result, according to the present invention described above, the degree (magnitude) of the energy of a lightning strike is quantitatively determined easily using a simple and inexpensive configuration in which an electrically conductive shield tape 10 for judging the charge quantity of a lightning strike is bonded to surfaces of the wind turbine blades. Accordingly, measures, such as repairs, required after a lightning strike can be adequately determined, and it is possible to definitely decide, for example, who is responsible for expenses necessary for repair of a damaged portion or compensation for damage, based on the quantitative value of the lightning energy. That is, the range of responsibility can be definitely determined from the quantitative value of the charge quantity of a lightning strike based on a criteria of 300 (C) or the like, which is a provision of the IEC (International Electrotechnical Commission). In addition, various types of contractual coverage relating to insurance for lightning strikes can be minutely determined based on quantitative values of the charge quantity of lightning strikes.

Furthermore, the above-mentioned electrically conductive shield tape 10 of the present invention can definitely be applied to a newly constructed wind turbine generator system, but the electrically conductive shield tape 10 also can be readily applied also to existing wind turbine blades 5.

The present invention is not limited to the above-mentioned embodiments, and it is possible to adequately modify, for example, the shape and type of the wind turbine blade within a range not departing from the spirit of the invention.

The invention claimed is:

1. A method of judging the energy level of a lightning strike in a wind turbine generator system generating electricity by driving an electrical generation mechanism through rotation of a rotor head to which a wind turbine blade is attached, wherein
an electrically conductive shield tape is bonded to surfaces of the wind turbine blade to determine charge quantity (C) of a lightning strike from the size of a damaged area formed in the electrically conductive shield tape by the lightning strike.

2. A method of judging an energy level of a lightning strike on a wind turbine blade of a wind turbine generator system, wherein an electrically conductive shield tape is bonded to an outer surface of the wind turbine blade, said method comprising:
determining a size of a damaged area caused in the electrically conductive shield tape by the lightning strike, and
based on the size of the damaged area, judging a quantity of charge in the lightning strike to determine the energy level of said lightning strike.

3. The method of claim 2, further comprising
predetermining a relationship between (i) a plurality of quantities of charge and (ii) sizes of a plurality of damaged areas respectively caused by said quantities of charge in at least one test electrically conductive shield tape of the same material as the electrically conductive shield tape bonded to the wind turbine blade,
wherein said judging comprises using the predetermined relationship to determine the quantity of charge in the lightning strike based on the size of the damaged area caused in the electrically conductive shield tape by the lightning strike.

4. The method of claim 3, wherein said predetermining comprises lightning simulation.

5. The method of claim 3, wherein said predetermining comprises
simulating a lighting strike, of one of said plurality of quantities of charge, on said at least one test electrically conductive shield tape,
determining the size of the damaged area caused by said simulated lightning strike in said at least one test electrically conductive shield tape, and
correlating the determined size of the damaged area with said one of said plurality of quantities to obtain said relationship.

6. The method of claim 5, wherein said simulating comprises
discharging electricity from a charger, via switch to an electrode and eventually to said at least one test electrically conductive shield tape to cause the damaged area on said at least one test electrically conductive shield tape.

7. The method of claim 6, further comprising
varying at least one of energy density, charge quantity, or peak current of the electricity discharge to simulate lighting strikes of various said plurality of quantities of charge.

8. The method of claim 3, wherein said relationship comprises a table that correlates the plurality of quantities of charge to the sizes of the respective plurality of damaged areas.

9. The method of claim 2, further comprising
based on the determined energy level of said lightning strike, assigning a responsibility for repairing the wind turbine blade to a respective one among a plurality of parties.

10. The method of claim 2, further comprising
bonding said electrically conductive shield tape to the wind turbine blade before said lightning strike occurs.

* * * * *